United States Patent
Bellin et al.

(10) Patent No.: US 6,659,272 B2
(45) Date of Patent: Dec. 9, 2003

(54) SYSTEM FOR STORING AND TRANSPORTING DISCS AND ACCESSORY MATERIALS

(75) Inventors: Russell D. Bellin, Los Angeles, CA (US); Christopher Glupker, Van Nuys, CA (US); Ravi Sawhney, Calabasas, CA (US); Craig Steele, Manhattan Beach, CA (US); Albert R. Trussell, Los Angeles, CA (US)

(73) Assignee: Church of Spiritual Technology, Los Angeles, CA (US)

( * ) Notice: Subject to any disclaimer, the term of this patent is extended or adjusted under 35 U.S.C. 154(b) by 106 days.

(21) Appl. No.: 10/038,594

(22) Filed: Jan. 3, 2002

(65) Prior Publication Data

US 2003/0010664 A1 Jan. 16, 2003

Related U.S. Application Data

(60) Provisional application No. 60/305,425, filed on Jul. 13, 2001.

(51) Int. Cl.[7] .............................................. B65D 85/57
(52) U.S. Cl. .................... 206/232; 206/308.1; 206/445; 206/459.5
(58) Field of Search ................................ 206/232, 303, 206/307, 308.1, 308.3, 311, 387.1, 387.13, 445, 459.5, 472, 473; 220/326

(56) References Cited

U.S. PATENT DOCUMENTS

| | | | | |
|---|---|---|---|---|
| 5,131,558 A | * | 7/1992 | Hiromori | 220/326 |
| 5,209,593 A | * | 5/1993 | Ros | 206/472 |
| 5,472,110 A | * | 12/1995 | Boyd et al. | 220/326 |
| 5,697,498 A | * | 12/1997 | Weisburn et al. | 206/308.1 |
| 5,833,062 A | * | 11/1998 | Yeh | 206/308.1 |
| 5,862,935 A | * | 1/1999 | Dubois et al. | 220/326 |
| 5,915,548 A | * | 6/1999 | Sasaki | 206/308.1 |
| 5,947,321 A | * | 9/1999 | Vadney | 220/326 |
| 6,378,696 B1 | * | 4/2002 | Smouha | 206/308.1 |
| 2003/0042154 A1 | * | 3/2003 | Koch | 206/308.1 |

* cited by examiner

*Primary Examiner*—Jim Foster

(57) ABSTRACT

A storing and transporting system for compact discs ("CD's") for recorded audio materials and related accessory materials such as notebooks or booklets comprising an outside case of flat, clamshell configuration defining two storage areas, and one or two box-like disc containers of similar configuration to be nested in the storage areas and each having a tray-like body for holding a stack of discs in flexible storage envelopes. Guides and partitions in the case define the two storage areas and hold the stored items snugly therein, and the containers have removable retainers for holding a selected number of disc envelopes therein. Integral recessed latches hold the covers releasably in closed positions, and the case and the container are sized to receive and hold preselected numbers of discs and booklets of related materials so as to be highly versatile in use, and are provided with convenient label areas.

70 Claims, 10 Drawing Sheets

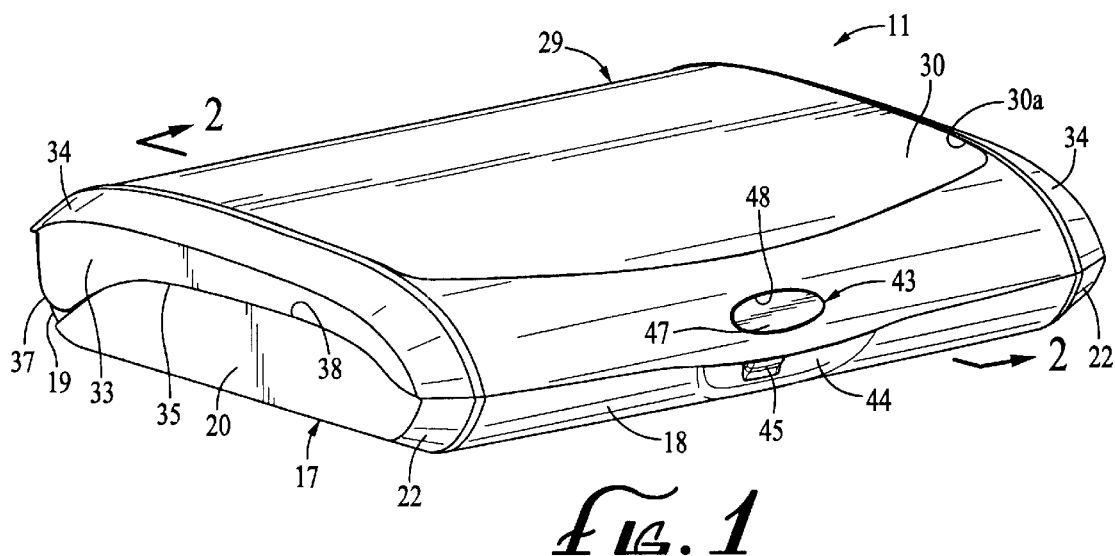
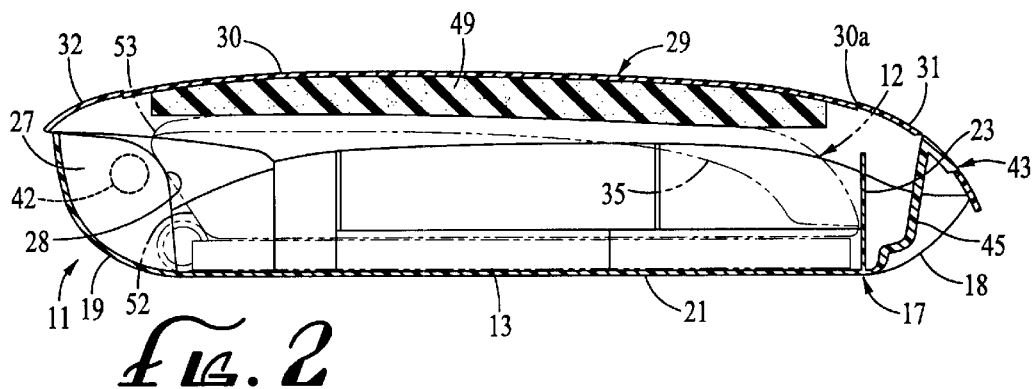
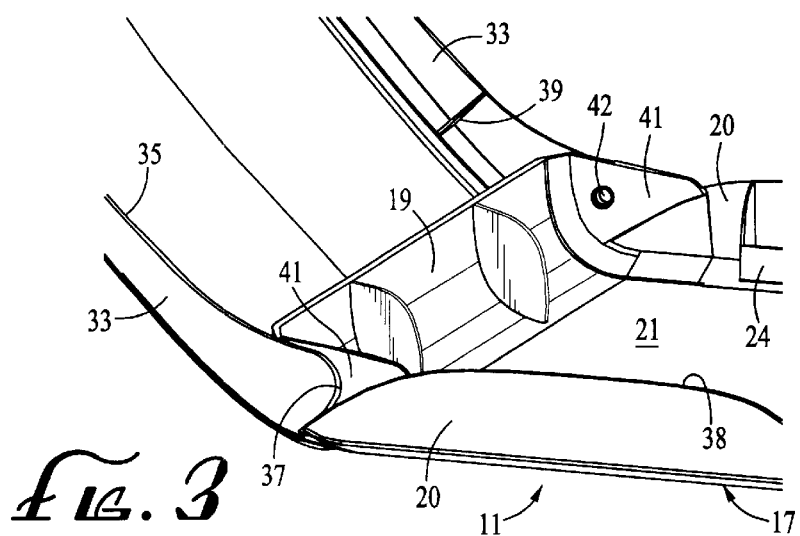

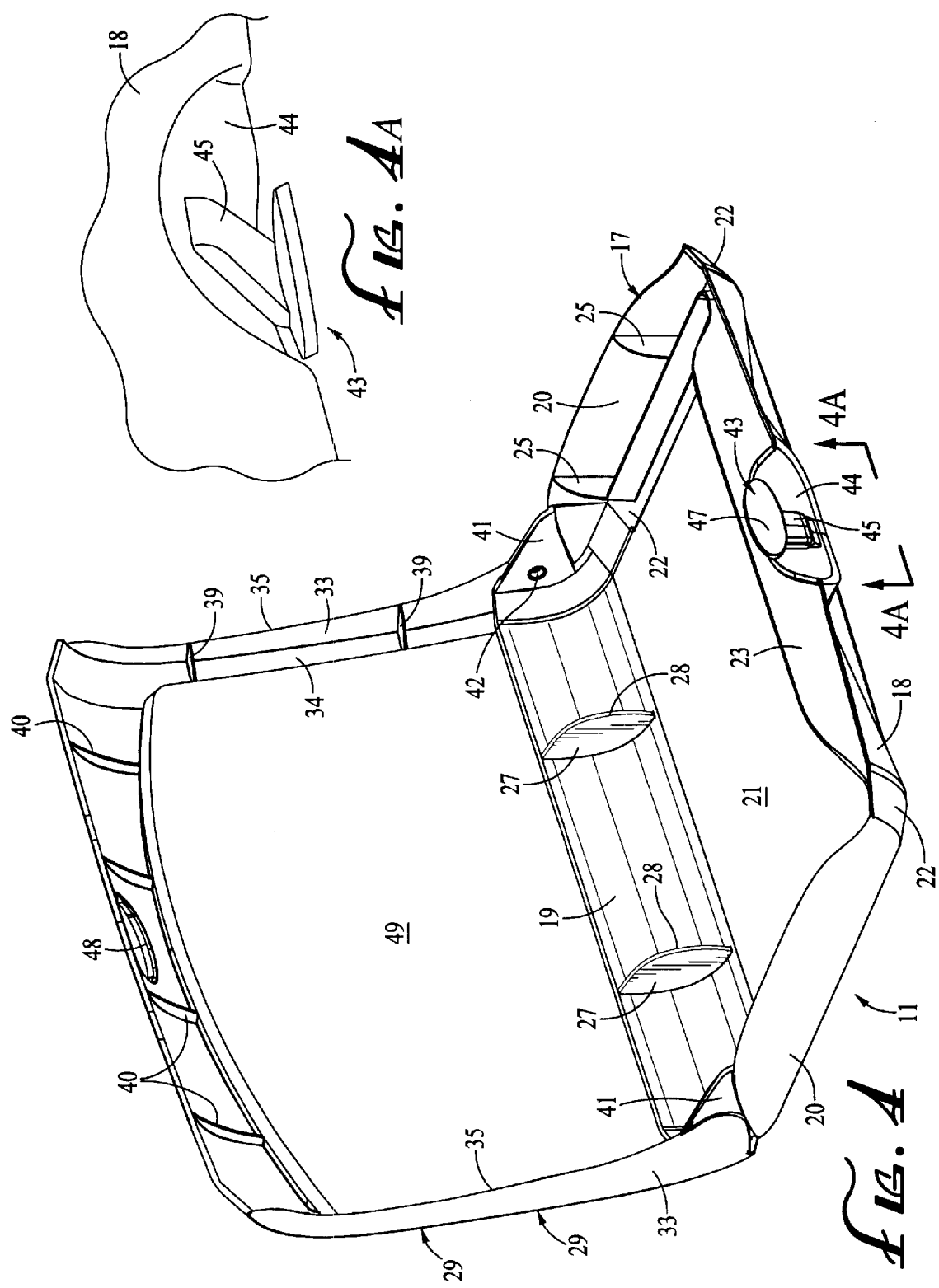

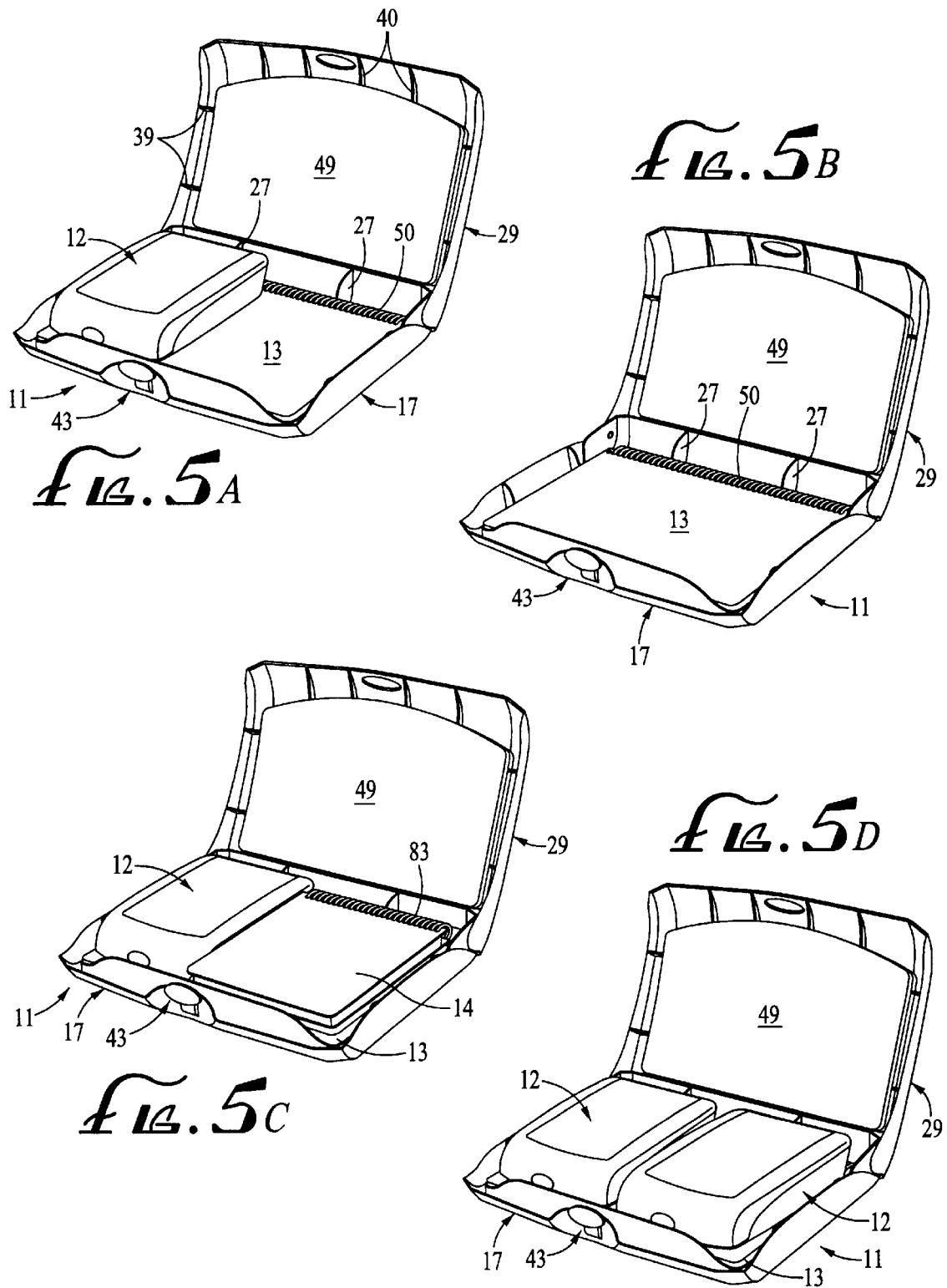

SYSTEM FOR STORING AND TRANSPORTING DISCS AND ACCESSORY MATERIALS

CROSS REFERENCE TO RELATED APPLICATION

This application claims priority based upon provisional application Serial No. 60/305,425, filed Jul. 13, 2001.

BACKGROUND OF THE INVENTION

This invention relates generally to the storing and transporting of discs such as so-called compact discs ("CD's") for recorded audio materials or other disc-shaped articles such as digital video discs ("DVD's"). The invention has particular reference to storage and transporting of pre-recorded discs such as CD's and related accessory materials such as notebooks or booklets containing transcripts, glossaries or otherwise relating to the discs.

With the advent of enormous numbers and types of pre-recorded discs, particularly those containing recorded music or digitally recorded motion pictures, numerous different types of systems for storing and transporting the discs have been proposed and used. For example, a basic box-type of protective storage case as shown in U.S. Pat. No. 5,899,327 with a central hub member and various disc-locating elements in the case. A larger combined storage case and tray for two stacks of compact discs is shown in U.S. Pat. No. Des. 359,193, with one or two stacks of rigid disc holders held on pins in a covered tray that apparently is composed of clear plastic. A soft zippered binder or wallet with plastic film envelopes forming holder pages is shown in U.S. Pat. No. 6,106,015, and a similar binder in a double-stack form has been shown in an on-Line publication under "CD Products" at www.cdprojects.com.

While such carriers, containers and systems have been generally adequate for their intended purposes, they have been found to have various shortcomings that limit their usefulness to specific relatively simple situations and prevent them from being optimum systems. One field in which there has been a particular need for a better system is the field of pre-recorded lectures for study purposes, wherein written accesory materials often accompany the CD's on which the lectures are supplied to the students, to assist them in their studies. Such accessory materials may include written transcripts of the audio material, glossaries of terms to be encountered in the lectures, and perhaps study guides of other types. When a series of lectures filling a plurality of discs is provided, with one or more notebooks or booklets as accessory materials, the problems of neat, compact and secure storage, transportation and convenient access can be serious challenges for the student.

SUMMARY OF THE INVENTION

The present invention resides in a unique and streamlined system for the storage and transportation of recorded discs and accessory materials that is highly versatile and flexible in relation to the different types and quantities of items that can be stored and, in addition to being sleek and attractive in style and appearance, holds the stored materials in organized and easily accessible fashion that makes the system a pleasure for the student to use. For these purposes, the invention provides an outside case that is of generally flat, "clamshell" configuration having a tray-like body defining two side-by-side substantially identical storage areas or sections, forming a larger double storage area, and at least one box-like disc container, also of clamshell configuration, to be nested in one of the storage areas and having a narrow tray-like body sized to receive and hold a stack of discs of a predetermined standard size encased in storage envelopes that are removably secured in the container. A second such disc container can be provided in the second storage area if the series requires a number of discs larger than the substantial capacity of one container, or a booklet that is about the same size as a container may be provided in the second storage area.

The thickness of the containers is less than the thickness of the storage areas to provide space for a large booklet under the containers when two are used, this space preferably being filled by a foam pad or the like when only one container is used with a small booklet in the other storage area. Guides are provided in the case to define the two storage areas and hold the stored items snugly therein, and the containers have highly effective retainers for securing a selected number of disc envelopes in place in the containers, and holding them for convenient access by the student. Both the case and the containers have novel, simple and effective latches normally holding them closed, and the case has flat side edges which permit it to be stored on edge in a book-like position on library or other shelves, desks or tables. The configuration of the case also permits labeling on the bottom with a label that extends onto the rear wall, which resembles the spine of a book when the case is stored on edge.

Other aspects and advantages of the invention, including detailed features of construction and operation, will be apparent from the following detailed description, taken in conjunction with the accompanying drawings.

BRIEF DESCRIPTION OF THE DRAWINGS

FIG. 1 is a front perspective view of a case for storing and transporting discs and accessory materials embodying the novel features of the present invention;

FIG. 2 is a cross-sectional view taken along the line 2—2 of FIG. 1, with the positions of a disc container and booklet shown in broken lines;

FIG. 3 is a fragmentary perspective view of the case, shown empty and with the cover in the open position;

FIG. 4 is a full perspective view of the open case;

FIG. 4A is an enlarged fragmentary view taken in the direction of the arrows 4A—4A in FIG. 4.

FIG. 5 is a composite of four different perspective views of the open case on a reduced scale, showing in FIG. 5A the case loaded with a disc container in one storage area and a large booklet occupying the lower portions of both storage areas; in FIG. 5B the case of FIG. 5A with the disc container removed; in FIG. 5C the case with one disc container in one storage area and a small booklet beside the container in the other storage area, with a filler pad or large booklet beneath the container and the booklet; and in FIG. 5D, the case loaded with two disc containers and with a large booklet beneath them;

DETAILED DESCRIPTION OF THE PRESENTLY PREFERRED EMBODIMENT

Figure 6:
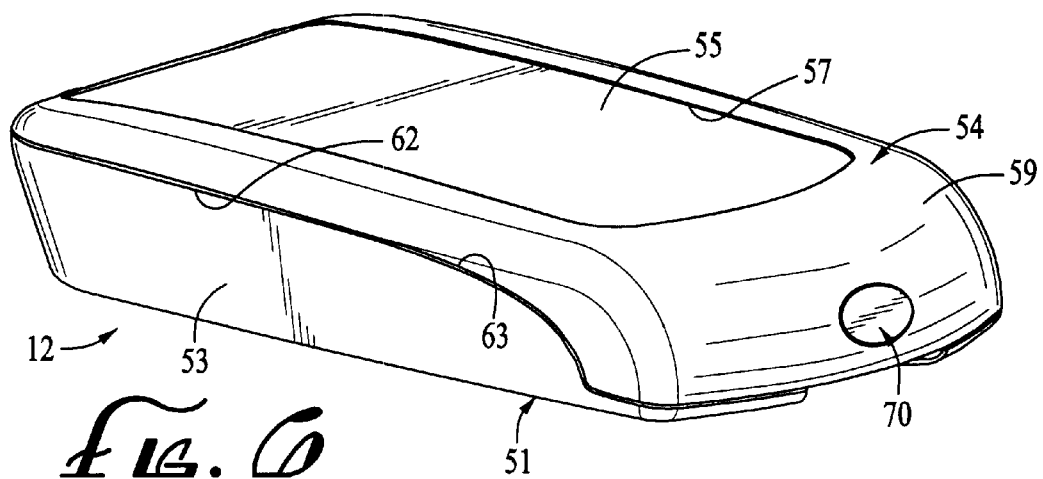
FIG. 6 is an enlarged front and left side perspective view of a disc container.
Figure 7:
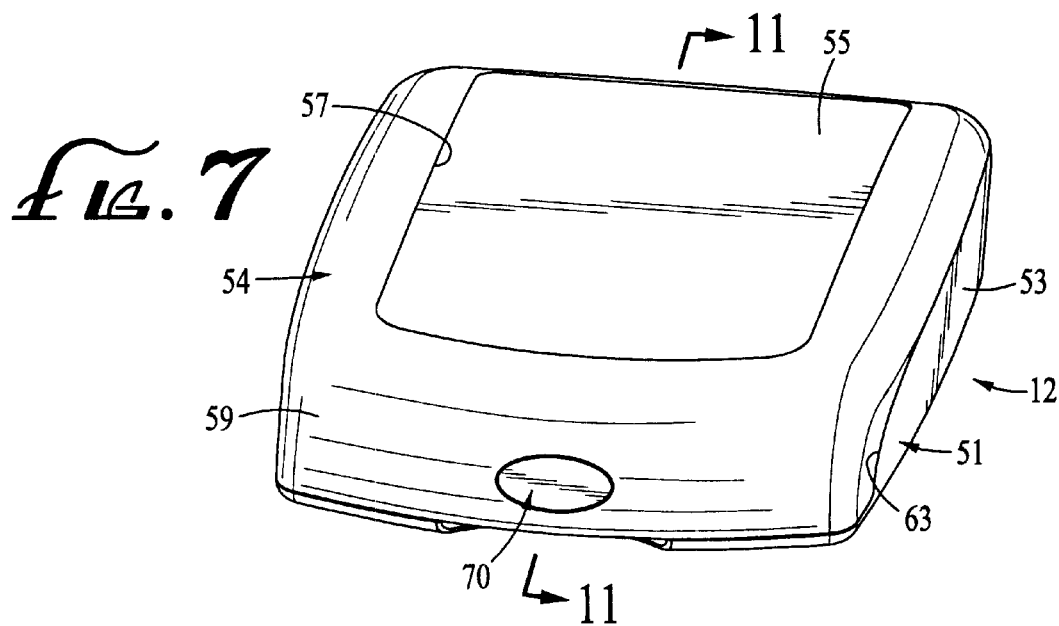
FIG. 7 is top perspective view of the disc container.

As shown in the drawings for purposes of illustration, the invention is embodied in a system for storing and transporting compact discs ("CD's") containing pre-recorded programs such as educational lectures, indicated generally by the number 10 in FIGS. 9 through 14. The system comprises an outside case, designated by the number 11, and at least one disc container designated generally by the number 12, and sometimes two such containers if the number of discs is greater than the capacity of one. In addition, the system of the invention accommodates the storage and transporting of accessory materials for use with the pre-recorded programs on the CD's, either in the form of a large booklet 13 (see FIGS. 2, 5A and 5B) or in the form of a smaller booklet 14 or 15 (see FIGS. 5C and 9–14), depending upon the make-up of the particular program that is to be stored. The disc containers 12 sometimes are referred to as "modules" and the case 11 as a "binder," in keeping with the interchangeability of modular containers in the system and the preferred function of the case of holding an entire course of study in compact, organized condition for convenience in storage, study and transportation, such as to and from a course room or study hall.

Both the case 11 and the modular disc containers 12 of the present invention are designed and constructed to be sleek and streamlined in appearance and, at the same time durable in construction, versatile and flexible in capability to accommodate different types and quantities of material, and "user friendly" for convenient access to the stored discs and materials and ease of returning the same to the stored, organized condition. The preferred material for the case and the modules is a hard molded plastic such as polycarbonate, which may be clear for visibility in appropriate areas and tinted different colors in different areas or for different series of lectures. A preferred look for the plastic is a translucent black that makes the case very attractive while obscuring the contents.

As will be seen most clearly in FIGS. 1 through 5, the presently preferred embodiment of the case 11 is a generally flat, clamshell configuration with rounded and tapering front and rear sides and beveled side edges contributing to the streamlined appearance. The lower portion of the case is a tray-like body 17 (see FIG. 4) having an upwardly rounded front and rear walls 18 and 19, and upright side walls 20 and a flat bottom wall 21, the side walls being joined to the bottom wall by bevels 22.

The interior of the body provides an internal storage area that is of preselected size, defined between an upright front partition 23 spaced inwardly from the front wall, two upright side guides 24 disposed along the inner sides of the side walls 20 and braced by side ribs 25. These guides are spaced a preselected distance apart to define the lateral sides of the internal storage area, and two rear guides 27 in the form of ribs extending forwardly from the rear wall 19 and having front upright edges 28 forming locating surfaces that are spaced a preselected distance from the front partition 23. It will be seen that these elements define the storage area above the flat bottom wall 21 of the body, leaving narrow clearance spaces within the rounded front and rear portions and above the side bevels 22. All of the internal guides and their bracing elements may be molded integrally of plastic in one piece with the body of the case.

A cover 29 normally overlies the tray-like body 17 in a closed position, shown in FIGS. 1 and 2, and has a top wall 30 with rounded front and rear portions 31 and 32 curving downwardly to meet the front and rear walls of the body. Depending side walls 33 of the cover meet the side walls 20 of the body 17, being joined to the top wall by bevels 34. It will be seen in FIG. 1 that each depending side wall 33 has a normally downwardly facing lower edge 35 of concave curvature, from a rounded rear enlargement 37 forwardly toward the front of the cover, and the upstanding side wall 20 of the body 17 has an upwardly facing upper edge 38 that has a complementary curvature, to lie flush against each other and provide a smooth side for the case 11. The opposite side has the same features. Reinforcing ribs 39 and 40 preferably are provided to stiffen the front and sides of the cover (see FIG. 4).

To form the hinge between the cover 29 and the body 17, two hinge ribs 41 are formed on the rear wall 19 at its opposite ends to extend forwardly, parallel to the guide ribs 27 and just inside the side walls 20 of the body, to lie alongside the rounded enlargements 37 on the rear side of the cover. Two hinge pins 42 are secured to the laterally inner sides of the rounded enlargements, on the centers of curvature of the rounded enlargements 37 thereof, and extend rotatably into two aligned holes in the hinge ribs 41, thereby defining a hinge axis extending across the rear portions of the body and the cover. With the pins on the centers of curvature of the enlargements 37, the edges thereof slide smoothly along the edges 38 of the body during opening and closing of the cover.

A latch 43 for holding the cover 29 releasably in the closed position is provided in the central portion of the front of the case 17. As can be seen most clearly in FIGS. 2, 4 and 5, the latch is mounted in a recess 44 (see FIG. 4A) formed in the upwardly curved front portion of the body by an outwardly concave wall, and comprises a narrow latch arm 45, herein composed of resiliently flexible plastic and integral with the body of the case, and a detent element 47 on the free upper end of the arm. Herein, the detent element is an oval "button" having a flat outer face, and a detent opening 48 of the same shape is formed in the overhanging portion of the cover to engage the button as the cover is enclosed, and to effectively hold the cover in the closed position by fitting snugly around the button. To unlatch or release the cover, the latch button 47 is pressed inwardly by the user, out of the detent opening 48, and the cover is lifted to the open position. When the latch button is released, the arm 45 returns it to its latching position ready for engagement in the latch opening 48 when the cover is closed.

It will be seen in FIGS. 4 and 5A, 5B, 5C and 5D that the interior of the case 11 provides a large double storage area over the bottom wall 21 of the case that is bounded by the front partition 23, the side guides 24 and the front guide edges 28 of the rear guide ribs 27. When the cover 29 is closed, the top wall 30 of the cover completes the enclosed space, preferably having a flat pad 49 of foam plastic or other cushioning material adhesively secured to its underside and sized to bear lightly against the contents of the case as shown in FIG. 2.

Illustrated in the several views of FIG. 5 are some different arrangements of contents for the case 11 in accordance with the present invention. In FIG. 5A, one modular disc container 12 is shown in the lefthand side of the double storage area, to hold a recorded course on up to thirteen CD's, as will be explained, and the large transcript booklet 13 is fitted in the double storage area beneath the container 12. This booklet is sized to fit snugly between the various guides (see FIG. 5B), with a spiral binder 50 along one edge engaged with the rear guides 27 to provide lateral stability in the case. The disc container 12 fills one-half of the double storage area (FIG. 5A), leaving space in the righthand half for a smaller booklet 14 which is made about the same size as the disc container 12. This booklet contains additional material related to the recorded course, such as a glossary of terms to assist the student in studying the course. The fully organized and packed combination of course components, including CD's and accessory materials, is shown in FIG. 5C.

Figure 9:
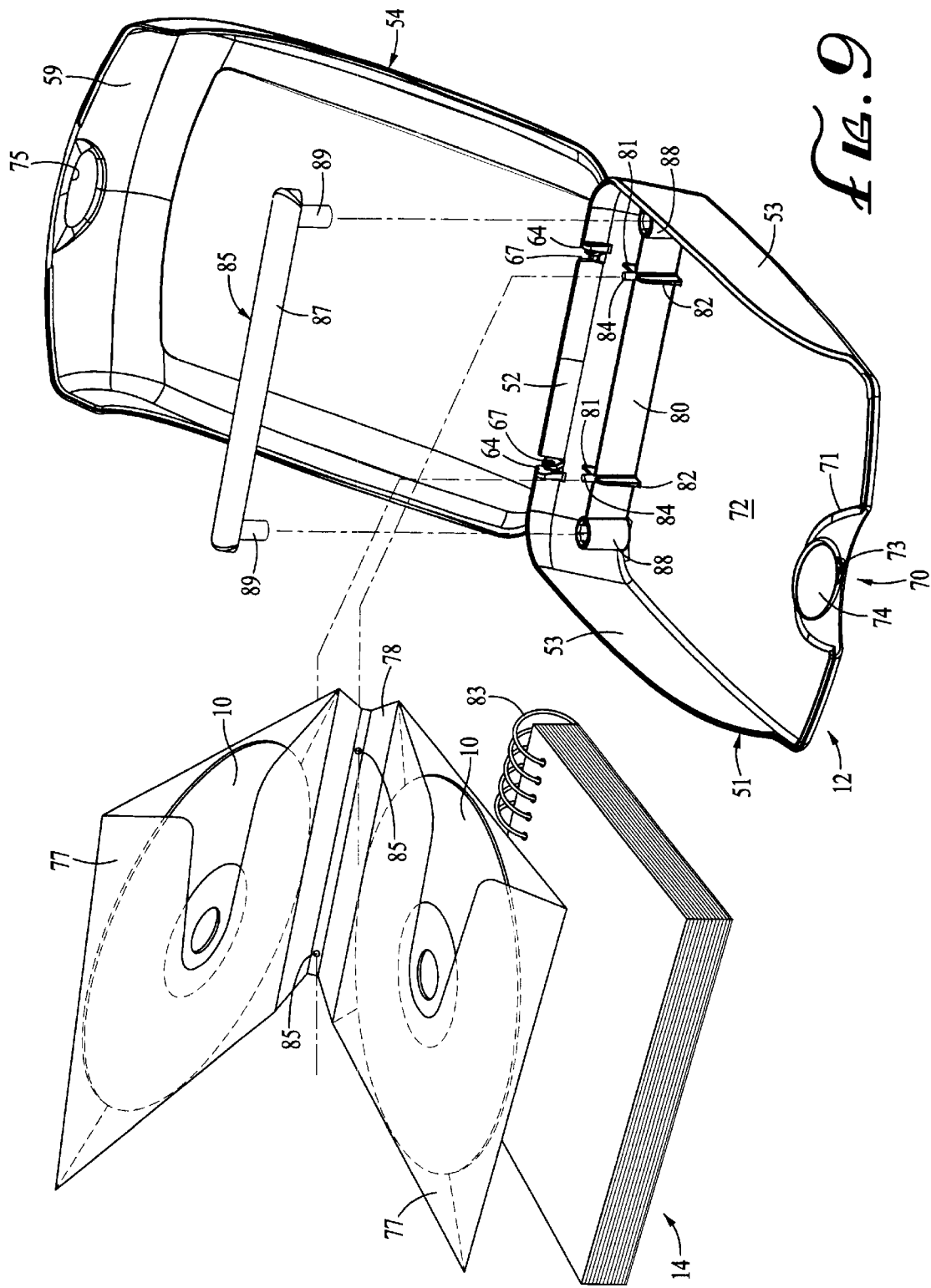
FIG. 9 is an exploded perspective view showing the disc container in an intermediate open position, two disc envelopes joined together by an integral hinge leaf and containing two discs, and a small booklet for underlying the discs in the container.
Figure 10:
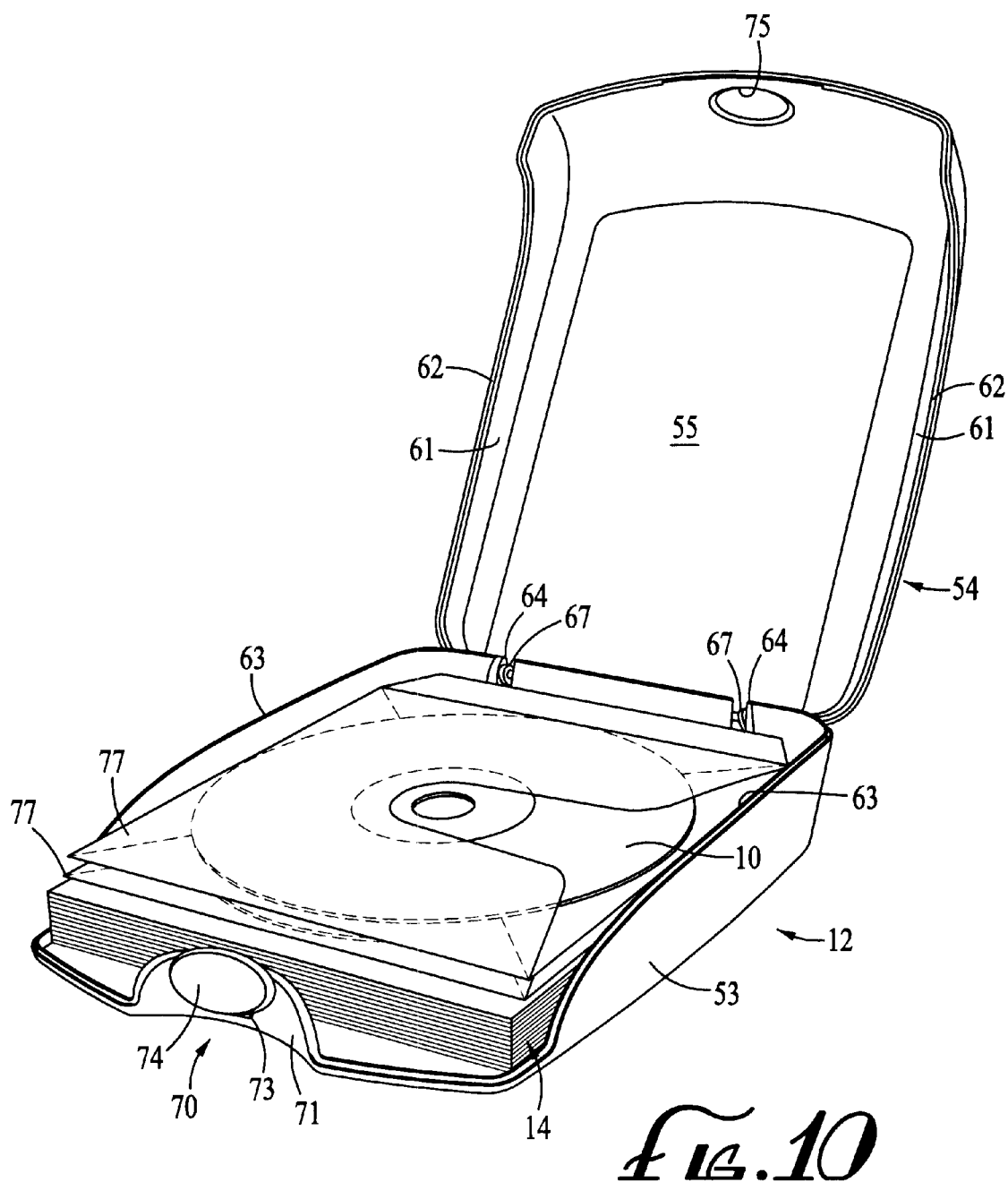
FIG. 10 is a perspective view of the disc container and the parts shown in FIG. 9, shown in the assembled or loaded condition.
Figure 11:
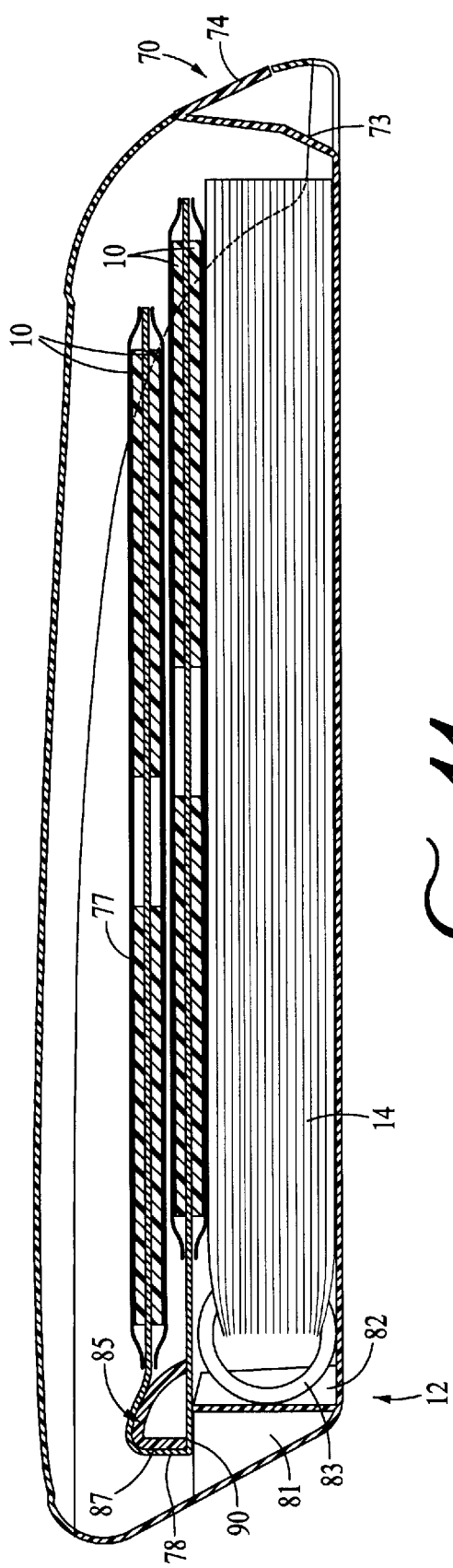
FIG. 11 is an enlarged cross-sectional view taken along the line 11—11 of FIG. 7, showing a disc container loaded with a small booklet and two double-sided disc envelopes loaded with four discs.

When a larger number of CD's than the capacity of one disc container 12 is needed for a course of study, two disc containers 12 are provided in side-by-side relation as shown in FIG. 5D. In this instance, the large booklet 13 shown in FIG. 5B is beneath the two containers, and glossary materials are provided elsewhere, such as within one or both of the containers, as shown in FIGS. 9–11. The versatility of this system lies in its ability to accommodate varying amounts of course material, both recorded and written, in the various components, which can be adapted to hold different amounts of such materials by varying the numbers of discs, the sizes and numbers of booklets, and also the type sizes and fonts, to fit the available space of the components that are included in a particular combination. In other words, the system can be adapted to different course and study requirements within the boundaries of the case 11 and the modules or containers 12.

As can be seen in FIGS. 6 through 9, the disc container or module 12 of the presently preferred embodiment of the invention has an outside shape that is generally similar to the clamshell shape of the case 11, but less than one-half the lateral width of the case. The module is sized to fit snugly in a storage area that is one-half of the overall storage area of the case, between the front partition 23, the rear guides 28 and one of the side guides 24, as shown in FIG. 5A, and has a thickness or height that is selected to fit closely between the booklet 13 and the cushion pad 49 in the cover. In other words, the dimensions of the case 11 and the container 12, as well as those of the booklets 13 and 14, are preselected and correlated so as to fit together and hold the various materials in the manner that has been described.

Externally, the disc container 12 is box-like in shape and comprises a lower tray-like body 51 formed by upright rear and side walls 52 and 53, respectively, and having an open front side for ease of access to the contents, and a cover 54 that normally overlies the container body in a closed position (FIGS. 6–8) but is movable through an intermediate open position (FIG. 9) for access to the contents, into a fully open position (not shown) in which the cover lies flat behind the body. The cover has substantially flat top 55, preferably recessed at 57 to receive a label, a front wall 59 curving downwardly to the front edge of the container body and closing the front side thereof, and rear and side edge portions 60 and 61 that are gently rounded. The downwardly facing edges 62 of the container are aligned with and engage the upwardly facing edges 63 of the container body, having complementary shapes to close neatly and easily into the closed position as shown in FIG. 6. It can be seen most clearly in the broken lines in FIG. 2 that the rear wall 52 of the container body 51 is inclined upwardly and rearwardly to an upper rear shoulder 53 that engages the rear guides 28 in the case 11. Thus, the lower portion of the rear wall 52 is offset forwardly from the rear guides, providing clearance for the spiral binding 50 of the booklet 13 beneath the disc container.

Figure 8:
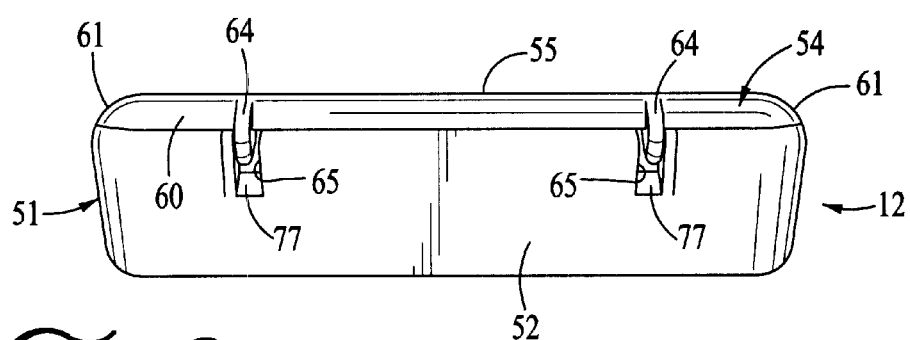
FIG. 8 is a rear elevational view of the disc container.

To mount the container cover 54 on the container body 51 for selective movement between the open and closed positions, a hinge is formed between the rear sides thereof, herein by two hinge leaves 64 (FIG. 8) in the form of fingers that are formed integrally with the rear edge of the container cover and project into notches 65 formed in the upper edge of the rear wall 52 of the container body, and by two hinge pins 67 (see FIG. 9) that are secured to the rear wall, on side walls of the notches 65, and are rotatably received in holes in the hinge leaves 64. As can be seen in FIGS. 6 and 8, this provides an effective, compact hinge that is substantially recessed and unobtrusive.

As with the case 11, the disc container 12 has a easily operable and effective latch 70 that contributes to the sleek and streamlined character of the system of the invention. In this instance, the latch 70 is mounted on the outer side of an upstanding, bowed wall 71 on the front edge of the bottom wall 72 of the container body, and takes the form of an upwardly extending, resiliently flexible arm 73, preferably similar to the arm 45 and integrally formed of plastic with the container body, and a detent 74 on the free upper end of the arm, herein in the shape of an oval button. The latch button 74 is received with a close fit (see FIG. 11) in an oval detent opening 75 that is formed in the rounded front wall 59 of the container cover 54, and normally holds the cover in the closed position.

To release the latch 70, the latch button 74 can be pushed inwardly, toward the rear wall, to disengage it from the detent opening 75, thereby permitting the container cover 54 to be swung into the open position. In this position, the hinge leaves 64 abut against the lower walls 77 (FIG. 8) of the hinge notches 65, limiting the swinging motion of the cover. It will be seen in FIGS. 9 and 10 that the cover is inclined rearwardly away from a vertical position in an intermediate position, and is movable beyond this position to a fully open position in which it will rest on the supporting surface. This will protect the hinge against damaging forces that otherwise could be sustained. Then, as the cover swings back into the closed position, the latch opening 75 swings back over the latch button 74, and the button becomes engaged in the opening and subsequently holds the cover closed. The edges of the button and around the opening preferably are beveled to facilitate movement of the parts into the latched condition, in both latches.

Figure 12:
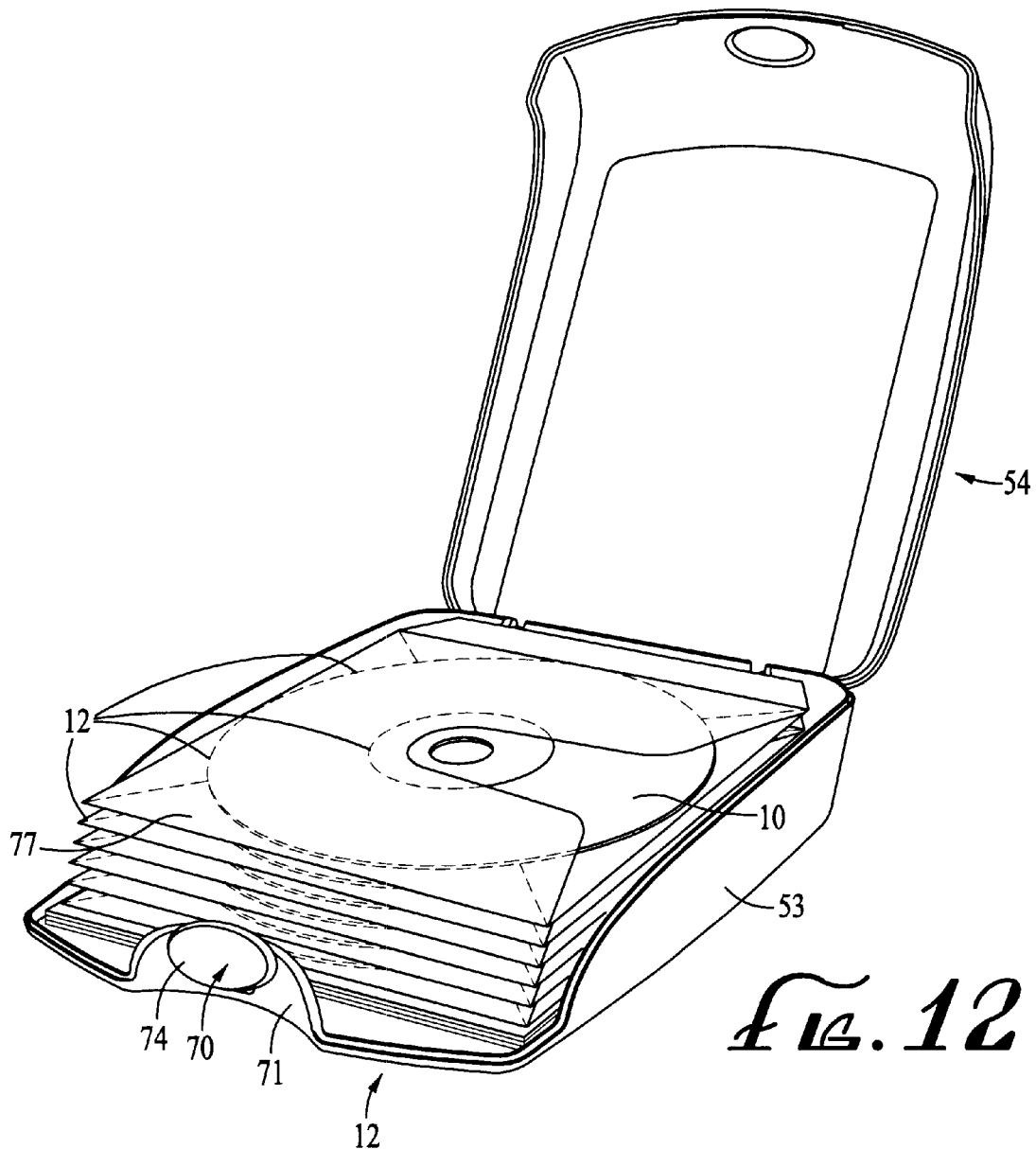
FIG. 12 is a view of a disc container similar to FIG. 10 showing the container loaded with twelve discs in six double-sided envelopes and a small booklet under the discs.
Figure 13:
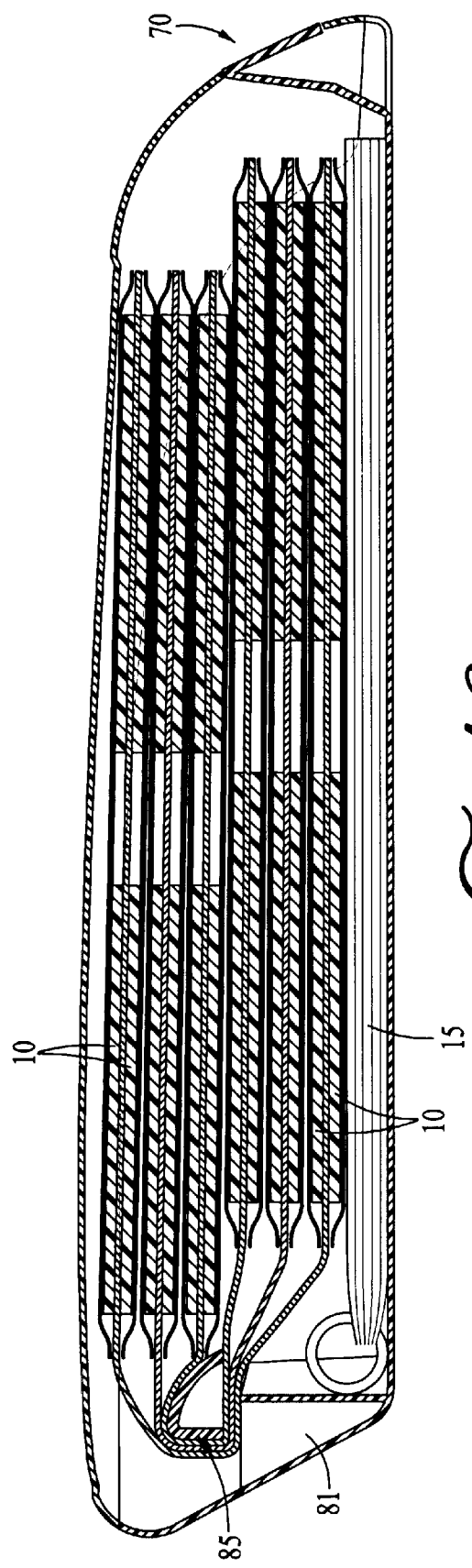
FIG. 13 is an enlarged cross-sectional view similar to FIG. 11 but taken through the disc container of FIG. 12 in the closed position.
Figure 14:
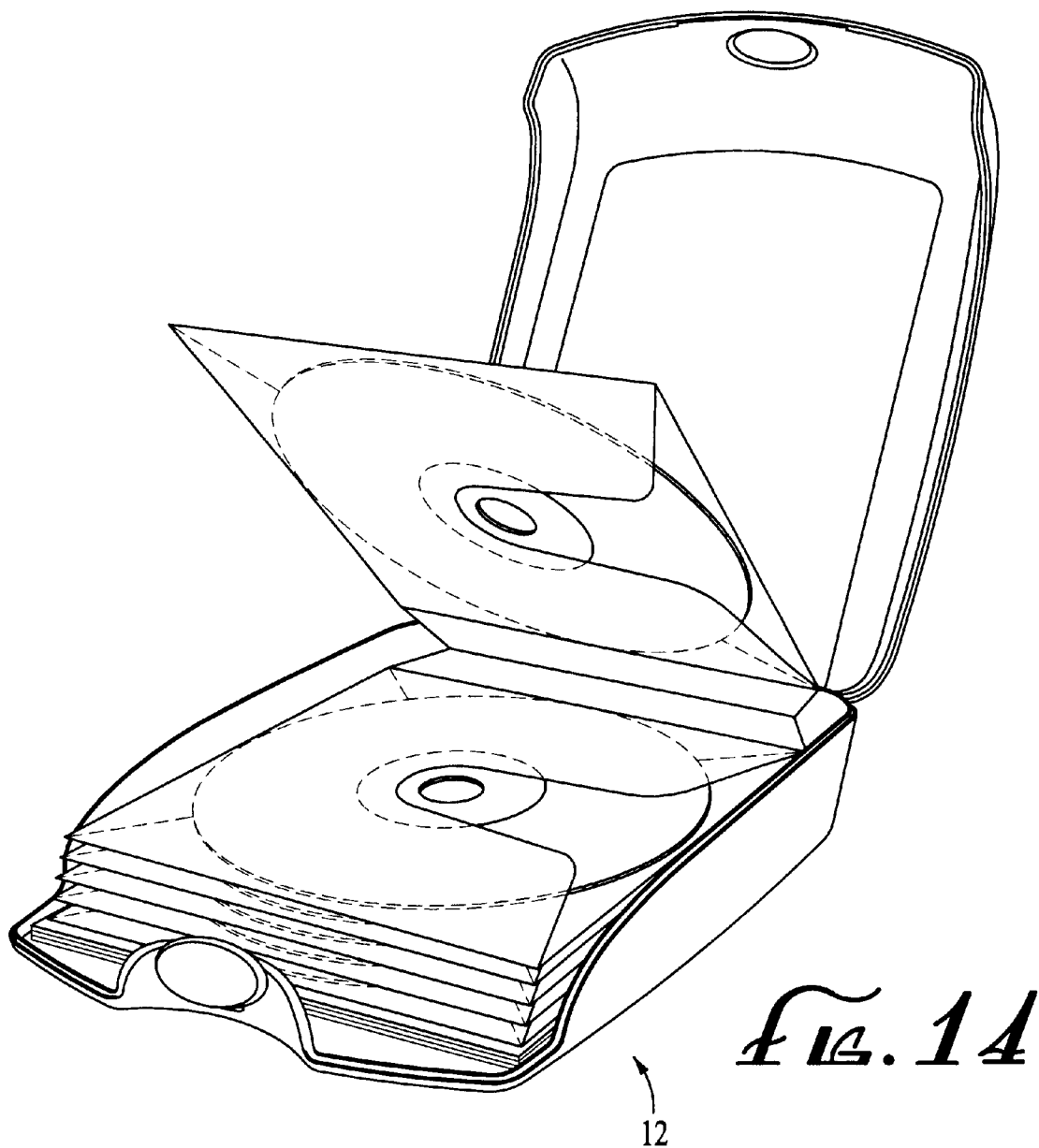
FIG. 14 is a perspective view similar to FIG. 13, showing single-sided envelopes on top of the stack of discs and illustrating the movement of the envelopes for access to discs in the container.

Compact discs 10 are stored in the disc container 12 in envelopes 77 of conventional types that may be either single-sided as shown in FIGS. 9 and 10, or double-sided as shown in FIGS. 11 and 12, and typically are supplied in pairs that are joined together along one side edge by a flexible connection 78 that permits the envelopes to swing from side-to-side storage positions (FIGS. 10–13) to separated or access positions (FIGS. 9 and 14). The connections of the illustrative envelopes 77 are flexible sheets that integrally join the two envelopes and are adapted to be clamped in place in the container.

For this purpose, the disc container 12 has a narrow rear partition 80 in front of the inclined rear wall 52 to serve as the mounting element for the envelopes, and also as a positioning element for a booklet 14 beneath the envelopes (see FIG. 11). This partition is secured to the bottom wall of the container and is braced by two front-to-rear stub walls 81 generally aligned with the hinges, these stub walls having front end portions 82 that form upright locating tabs on the partition for engaging the spiral binder 83 on the booklet and stabilizing it in the container. The spiral is engageable with the partition in the rear, and the front of the booklet lies close to the latch wall 71.

On top of the narrow rear partition at the junctures with the stub walls 81 are two upstanding locating pins 84 (FIG. 9) which are positioned to fit into two locating holes 85 that are provided in the flexible connections 78 of the double envelopes 77, the pins and holes being positioned to be engaged when the envelopes are properly positioned in the container. To lock the connections in place on the rear partition, a retainer 85 in the form of a bar 87 that overlies the partition and is releasably coupled to it by interfitting connectors 88 and 89 on the bar and the partition. In this case, the first connectors 88 are two upwardly opening cylindrical sockets on the opposite ends of the rear partition, with open upper ends that are level with the top of the partition, and the second connectors 89 are cylindrical pins on the underside of the retainer bar positioned to be pressed into the sockets on opposite sides of the disc envelopes. The pins are received in the sockets with a snug press fit, and thus are retained frictionally but removably in the sockets.

As can be seen in FIG. 11, the retainer bar 87 of the preferred embodiment of the invention is an inverted channel that straddles the rear partition and has a rear edge 90 that is clamped against the tops of the stub walls 81 with the web forming the flexible connection 78 of the disc envelopes caught beneath it. This cooperates with the locating pins 84 in holding the envelopes securely in the container.

FIGS. 10 and 11 show a four-disc combination held in one pair of double-sided envelopes 77, over a spiral-bound transcript booklet 14. This is an underfilled disc container, which can be left as is, with the ability to receive more discs, or can be augmented by a filler pad (not shown) beneath the booklet, if a filled condition is desired. FIGS. 12 and 13 show a twelve-disc combination held in three pairs of double-sided envelopes 77, over a relatively thin spiral-bound booklet 15 that may contain a glossary or other accessory materials. This is a nearly "capacity" load, one more disc being the optimum load that is appropriate for this particular container, accommodated by another single-sided envelope. It is to be understood, however, that the container can be designed in different sizes for different maximum capacities.

FIG. 14 illustrates the hinge action that is available with this mounting system, for ease of access to discs that are beneath the top of the stack in the container 12. The envelope (or envelopes) 77 that are above the disc 10 to which access is desired is lifted up into the open cover 54, and will be held there by gravity while the desired disc is pulled out of its envelope. After use, each disc is returned to its envelope, and the cover can be closed and latched to secure the discs for transportation and storage.

It should be noted that the system of the invention also has provided for convenient and effective labeling of the various components. The cover 29 of the case has a top wall 30 with a recess 30a for receiving and protecting a large label (not shown). This label typically would apply to the entire course that is combined in the case. A bottom label also may be applied to the case, and extended onto the rear wall 19 to provide label information that is visible (as on the spine of a book) when the case is stored on edge on a shelf.

Similarly, a recess 57 is formed in the top wall 55 of the disc container, for another label (not shown) that typically will apply to the contents of the container. If the cover is transparent, the label area may be frosted to obscure the underside of the label. Each container in a course can have different labels, and the booklets, of course, can have printed covers that pertain to their contents.

In addition, each latch 43, 70 provides another prominent area for a proprietary marking, such as a logo or trade name. This can be imprinted in the mold so as to be permanently marked on the retainer. The bar 87 of the retainer 85 also is an appropriate location for an imprinted logo or other identifying material.

From the foregoing, it will be evident that the present invention provides a novel and highly attractive system for storing and transporting discs such as CD's, along with accessory materials such as the large or small booklets disclosed, and is extremely versatile and flexible in its capabilities to accommodate a variety of different combinations of materials. It also will be evident that various modifications and changes may be made by those skilled in the art without departing from the spirit and scope of the invention.

We claim as our invention:

1. A system for storing and transporting discs of predetermined thickness and diameter in disc-holding sleeves and holding accessory materials of predetermined sizes, comprising:

an outside case of a generally flat, clamshell configuration having a lower tray-like body of preselected size formed by front, rear and side walls having free upper edges and a bottom wall and providing two side-by-side substantially identical storage areas, each of said storage areas being wider and longer than said predetermined diameter and deeper than a preselected multiple of said predetermined thickness so as to provide storage space larger than the space to be occupied by a number of discs equal to said predetermined multiple, and an upper cover for said body normally overlying said storage areas in a closed position and having front, rear and side cover edges adjacent to said front, rear and side upper edges;

said body and said cover having rounded front and rear portions forming forward and rearward tapers and having flat sides providing bases for standing of the case in a book-like storage position;

an upright internal front partition in said body spaced inwardly from said front wall and defining the front sides of said storage areas;

rear guides extending forwardly from said rear wall and having front locating surfaces spaced a preselected distance from said front partition to determine the rear sides of said storage areas;

upright side guides in said body disposed along the inner sides of said side walls and spaced a preselected distance apart to define the lateral sides of said storage areas;

means for hinging the rear portion of said cover on the rear portion of said body for swinging clamshell fashion into an open position in which the body is generally horizontal and the cover is inclined upwardly and rearwardly from the body;

means preventing swinging of said cover rearwardly beyond said open position;

a latch connecting said cover to the front wall of said body in said closed position and selectively releasable for movement of the cover to the open position;

at least one box-like disc container to be nested in one of said storage areas for holding a plurality of discs, said disc container having a preselected outside shape generally similar to the clamshell shape of said outside case and sized to fit snugly in said one storage area between said front partition and said rear guides and against one of said side guides thereof and spaced beneath the cover of said case;

said disc container comprising a lower tray-like container body formed by upright rear and side walls having free upper edges and having a bottom and a substantially open front side, and a container cover normally overlying said container body in a closed position and having rear and side container cover edges adjacent to said rear and side container body edges, said container cover having a front wall curving downwardly to said container body and closing the front side thereof when the container cover is in the closed position;

a rear partition in said container body spaced from said rear wall and having at least one locating surface spaced from said open front side a preselected distance that is greater than said predetermined diameter, whereby a stack of the discs in the disc-holding sleeves will fit into said container and lie between said rear partition and said front side of the container body;

a retainer for securing a plurality of disc-holding sleeves to said container along said rear partition thereby to hold the discs in said disc container;

and means for hinging the rear portion of said container cover on the rear portion of said container body for swinging clamshell fashion into an open position.

2. A disc storing and transporting system as defined in claim 1 wherein said rear guides are ribs extending forwardly from said rear wall of said case body and having front edges forming said locating surfaces, and said front partition is an upright internal wall extending between the side walls of said case body.

3. A disc storing and transporting system as defined in claim 1 wherein said side guides are upright internal walls spaced inwardly from the side walls of said case body and lying along at least a substantial portion of the laterally outer sides of the storage areas.

4. A disc storing and transporting system as defined in claim 1 wherein said cover of said case has depending side walls that straddle the side walls of the body of said case, and said means for hinging the rear portion of the cover of said case on the rear portion of the body of said case comprise hinge pins extending between said depending side walls and the side walls of said case body to define a hinge axis adjacent the rear wall of said case.

5. A disc storing and transporting system as defined in claim 1 wherein said bottom wall of said case is joined to said rear wall by a curved wall which forms the underside of said rounded rear portion, whereby a label may be applied to the outer side of the bottom wall and to said rear wall to be visible when the case is stored book-like on one of the flat sides.

6. A disc storing and transporting system as defined in claim 1 wherein said latch comprises a resiliently flexible arm on the front of the body of said case extending upwardly and forwardly toward said rounded front portion of the cover of said case, a detent on the upper end of said arm, and a detent opening in the cover of said case receiving said detent when the cover of the case is in the closed position, said arm being yieldable inwardly to disengage said detent from said opening.

7. A disc storing and transporting system as defined in claim 6 wherein said body of said case and said arm are formed integrally of plastic.

8. A disc storing and transporting system as defined in claim 6 wherein said case has an upwardly rounded front extension of said bottom wall curving up to the front portion of the cover of the case, and a central recess in said upwardly rounded extension, said latch arm being disposed in said recess.

9. A disc storing and transporting system as defined in claim 1 further including a resilient cushion secured to the inside of the cover of said case and of a preselected thickness for bearing against the top of said disc container and holding the same firmly in said one storage area.

10. A disc storing and transporting system as defined in claim 9 wherein said cushion is a foam plastic pad overlying both of said storage areas.

11. A disc storing and transporting system as defined in claim 1 wherein two of said disc containers are nested in side-by-side relation in said case.

12. A disc storing and transporting system as defined in claim 1 wherein said rear partition of said disc container body is a wall substantially parallel to the rear wall of the container and having locating ribs extending forwardly in the container, said wall having means thereon for coupling engagement with said retainer.

13. A disc storing and transporting system as defined in claim 12 wherein said means for coupling engagement comprise upwardly facing first connectors spaced apart along said rear partition, said retainer having downwardly facing second connectors that are releasably engaged with said first connectors.

14. A disc storing and transporting system as defined in claim 13 wherein said first connectors are sockets adjacent to the opposite ends of said rear partition and said second connectors are pins on said retainer sized to be received in said sockets with a tight fit.

15. A disc storing and transporting system as defined in claim 12 wherein said rear partition of said disc container body has an upper edge spaced above the bottom of the container, and said retainer is a crossbar extending along said upper edge to secure the disc-holding sleeves in the container.

16. A disc storing and transporting system as defined in claim 15 wherein said partition and said retainer have at least one locating member extending between them for locating engagement with portions of disc holding sleeves disposed between them.

17. A disc storing and transporting system as defined in claim 16 wherein two of said locating members in the form of upstanding pins are provided on said upper edge of said partition and positioned thereon to extend through openings in the disc-holding sleeves.

18. A disc storing and transporting system as defined in claim 1 wherein the means for hinging the rear portion of said container cover on the rear portion of the container body comprise hinge leaves on the rear edge of the cover of said container projecting into recesses in the rear wall of the body of the container, and hinge pins in said recesses received in said hinge leaves and defining a hinge axis extending along the rear wall of the body of said container.

19. A disc storing and transporting system as defined in claim 18 wherein said container cover is swingable rearwardly to an open position in which the body and the cover will lie flat on a supporting surface.

20. A disc storing and transporting system as defined in claim 1 further including a second latch for holding the cover of the container releasably in the closed position.

21. A disc storing and transporting system as defined in claim 19 wherein said second latch comprises a curved mounting wall upstanding from the central portion of the bottom of said container and having a concave outer face defining a front recess, a second resiliently flexible latch arm secured to the bottom of the container body and projecting upwardly in said front recess beneath the front portion of the cover of the container, a second detent opening in the front portion of the container cover overlying said front recess, and a second detent on the upper end of said second arm disposed in said second detent opening when the container cover is in the closed position and movable inwardly upon inward flexing of the second arm to disengage said second latch.

22. A disc storing and transporting system as defined in claim 1 further including at least one disc-holding sleeve comprising two disc-holding envelopes each having a pocket therein for receiving and holding a disc of said predetermined thickness and diameter, said sleeves being disposed in side-by-side relation in the body of said disc container, and a flexible hinge strip joining said envelopes together along the rear side of said container, said retainer overlying said flexible hinge strip to retain the sleeve in the container.

23. A disc storing and transporting system as defined in claim 22 in which a plurality of such sleeves are stacked together and folded around said retainer.

24. A disc storing and transporting system as defined in claim 23 wherein the plurality of sleeves that are stacked together will hold thirteen discs in said container.

25. A disc storing and transporting system as defined in claim 22 wherein the inside thickness of said container is greater than twelve times the thickness of a disc in a sleeve, whereby additional space is provided in said cover, and further including an accessory in said additional space.

26. A disc storing and transporting system as defined in claim 25 wherein said accessory is a booklet of approximately the same length and width as said envelopes, and is disposed between said sleeves and the body of said container.

27. A disc storing and transporting system as defined in claim 22 further including a booklet sized to lie entirely within said container beneath said sleeve, said booklet having a binder on one side engaging said rear partition in said container.

28. A disc storing and transporting system as defined in claim 1 wherein said disc container is sized to hold a maximum of thirteen discs in disc-holding sleeves.

29. A system for storing and transporting discs of predetermined thickness and diameter in disc-holding sleeves and holding accessory materials of predetermined sizes, comprising:

an outside case of a generally flat tray-like configuration having a lower body of preselected size formed by front, rear and side walls having free upper edges and a bottom wall and providing two side-by-side substantially identical storage areas, each of said storage areas being wider and longer than said predetermined diameter and deeper than a preselected multiple of said predetermined thickness so as to provide storage space larger than the space to be occupied by a number of discs equal to said predetermined multiple, and an upper cover for said body normally overlying said storage areas in a closed position and having front, rear and side cover edges adjacent to said front, rear and side upper edges;

said body and said cover having rounded front and rear portions forming forward and rearward tapers and having flat sides providing bases for standing of the case in a book-like storage position;

rear guides extending forwardly from said rear wall and having front locating surfaces forming the rear sides of said storage areas;

upright side guides in said body disposed along the inner sides of said side walls and spaced a preselected distance apart to define the lateral sides of said storage areas;

means for hinging the rear portion of said cover on the rear portion of said body for swinging into an open position;

a latch connecting said cover to the front wall of said body in said closed position and selectively releasable for movement of the cover to the open position;

at least one box-like disc container nested in one of said storage areas for holding a plurality of discs, said disc container having a preselected outside shape generally similar to the shape of said outside case and sized to fit snugly in said one storage area between said front partition and said rear guides and against one of said side guides thereof and spaced beneath the cover of said case;

said disc container comprising a lower tray-like container body formed by upright rear and side walls having free upper edges and having a bottom and a substantially open front side, and a container cover normally overlying said container body in a closed position and having rear and side container cover edges adjacent to said rear and side container body edges, said container cover having a front wall curving downwardly to said container body and closing the front side thereof when the container cover is in the closed position;

a rear partition in said container body spaced from said rear wall and having at least one locating surface spaced from said open front side a preselected distance that is greater than said predetermined diameter, whereby a stack of the discs in the disc-holding sleeves will fit into said container and lie between said rear partition and said front side of the container body;

and means for hinging the rear portion of said container cover on the rear portion of said container body for swinging into an open position.

30. A disc storing and transporting system as defined in claim 29 wherein said rear guides are ribs extending forwardly from said rear wall of said case body and having front edges forming said locating surfaces, and including a front partition in the form of an upright internal wall extending between the side walls of said case body.

31. A disc storing and transporting system as defined in claim 29 wherein said side guides are upright internal walls spaced inwardly from the side walls of said case body and lying along at least a substantial portion of the laterally outer sides of the storage areas.

32. A disc storing and transporting system as defined in claim 29 wherein said bottom wall of said case is joined to said rear wall by a curved wall which forms the underside of said rounded rear portion, whereby a label may be applied to the outer side of the bottom wall and to said rear wall to be visible when the case is stored book-like on one of the flat sides.

33. A disc storing and transporting system as defined in claim 29 wherein said latch comprises a resiliently flexible arm on the front of the body of said case extending upwardly and forwardly toward said rounded front portion of the cover of said case, a detent on the upper end of said arm, and a detent opening in the cover of said case receiving said detent when the cover of the case is in the closed position, said arm being yieldable inwardly to disengage said detent from said opening.

34. A disc storing and transporting system as defined in claim 29 further including a resilient cushion secured to the inside of the cover of said case and of a preselected thickness for bearing against the top of said disc container and holding the same firmly in said one storage area.

35. A disc storing and transporting system as defined in claim 29 wherein two of said disc containers are nested in side-by-side relation in said case.

36. A disc storing and transporting system as defined in claim 1 wherein said rear partition of said disc container body is a wall substantially parallel to the rear wall of the container and having locating ribs extending forwardly in the container, and including a retainer for securing a plurality of disc-holding sleeves to said container along said rear partition thereby to hold the discs in said disc container said wall having means thereon for coupling engagement with said retainer.

37. A disc storing and transporting system as defined in claim 36 wherein said means for coupling engagement comprise upwardly facing first connectors spaced apart along said rear partition, said retainer having downwardly facing second connectors that are releasably engaged with said first connectors.

38. A disc storing and transporting system as defined in claim 37 wherein two locating members in the form of upstanding pins are provided on said upper edge of said partition and positioned thereon to extend through openings in the disc-holding sleeves.

39. A system for storing and transporting discs of predetermined thickness and diameter in disc-holding sleeves and holding accessory materials of predetermined sizes, comprising:

an outside case of a generally flat tray-like configuration having a lower body of preselected size formed by front, rear and side walls having free upper edges and a bottom wall and providing a storage area comprising two side-by-side substantially identical storage sections, each of said storage sections being wider and longer than said predetermined diameter and deeper than a preselected multiple of said predetermined thickness so as to provide storage space larger than the space to be occupied by a number of discs equal to said predetermined multiple, and an upper cover for said body normally overlying said storage area in a closed position;

said body and said cover having flat sides providing bases for standing of the case in a book-like storage position;

partition and guide members in said body spaced from the walls thereof and defining the front, rear and sides of said storage area;

means for hinging the rear portion of said cover on the rear portion of said body for swinging into an open position;

a latch connecting said cover to the front wall of said body in said closed position and selectively releasable for movement of the cover to the open position;

and at least one box-like disc container nested in one section of said storage area for holding a plurality of discs, said disc container having a preselected outside shape generally similar to the shape of said outside case and sized to fit snugly in said one section of said storage area between said partition and guide members and spaced beneath the cover of said case.

40. A disc storing and transporting system as defined in claim 39 wherein said partition and guide members include rear guides in the form of ribs extending forwardly from said rear wall of said case body and having front edges forming locating surfaces, and a front partition in the form of an upright internal wall extending between the side walls of said case body.

41. A disc storing and transporting system as defined in claim 39 wherein said partition and guide members include side guides in the form of upright internal walls spaced inwardly from the side walls of said case body and lying along at least a substantial portion of the laterally outer sides of the storage area.

42. A system for storing and transporting discs of predetermined thickness and diameter in disc-holding sleeves and holding accessory materials of predetermined sizes, comprising:

an outside case of a generally flat, tray-like configuration having a lower body of preselected size formed by front, rear and side walls having free upper edges and a bottom wall and providing a storage area comprising two side-by-side substantially identical storage sections, each of said storage sections being wider and longer than said predetermined diameter and deeper than a preselected multiple of said predetermined thickness so as to provide storage space larger than the space to be occupied by a number of discs equal to said predetermined multiple, and an upper cover for said body normally overlying said storage area in a closed position and having front, rear and side cover edges adjacent to said front, rear and side upper edges;

said body and said cover having flat sides providing bases for standing of the case in a book-like storage position;

means for hinging said cover on said body for swinging into an open position;

and at least one box-like disc container to be nested in one of said storage areas for holding a plurality of discs, said disc container having a preselected outside shape generally similar to the shape of said outside case and sized to fit snugly in said one section of said storage area beneath the cover of said case;

said disc container comprising a lower tray-like container body formed by upright rear and side walls having free upper edges and having a bottom and a substantially open front side, and a container cover normally overlying said container body in a closed position and having rear and side container cover edges adjacent to said rear and side container body edges, said container cover having a front wall curving downwardly to said container body and closing the front side thereof when the container cover is in the closed position;

a rear partition in said container body spaced from said rear wall and having at least one locating surface spaced from said open front side a preselected distance that is greater than said predetermined diameter, whereby a stack of the discs in the disc-holding sleeves will fit into said container and lie between said rear partition and said front side of the container body;

a retainer for securing a plurality of disc-holding sleeves to said container along said rear partition thereby to hold the discs in said disc container;

and means for hinging the rear portion of said container cover on the rear portion of said container body for swinging into an open position.

43. A disc storing and transporting system as defined in claim 42 wherein said rear guides are ribs extending forwardly from said rear wall of said case body and having front edges forming said locating surfaces, and said front partition is an upright internal wall extending between the side walls of said case body.

44. A disc storing and transporting system as defined in claim 42 wherein said side guides are upright internal walls spaced inwardly from the side walls of said case body and lying along at least a substantial portion of the laterally outer sides of the storage areas.

45. A disc storing and transporting system as defined in claim 42 wherein said cover of said case has depending side walls that straddle the side walls of the body of said case, and said means for hinging the rear portion of the cover of said case on the rear portion of the body of said case comprise hinge pins extending between said depending side walls and the side walls of said case body to define a hinge axis adjacent the rear wall of said case.

46. A disc storing and transporting system as defined in claim 42 wherein said bottom wall of said case is joined to said rear wall by a curved wall which forms the underside of said rounded rear portion, whereby a label may be applied to the outer side of the bottom wall and to said rear wall to be visible when the case is stored book-like on one of the flat sides.

47. A disc storing and transporting system as defined in claim 42 wherein said case body is composed of plastic and said latch comprises a resiliently flexible integral plastic arm on the front of the body of said case extending upwardly and forwardly toward said rounded front portion of the cover of said case, and including a detent on the upper end of said arm and a detent opening in the cover of said case receiving said detent when the cover of the case is in the closed position, said arm being yieldable inwardly to disengage said detent from said opening.

48. A disc storing and transporting system as defined in claim 42 further including a resilient foam cushion secured to the inside of the cover of said case and of a preselected thickness for bearing against the top of said disc container and holding the same firmly in said one storage area.

49. A disc storing and transporting system as defined in claim 42 wherein two of said disc containers are nested in side-by-side relation in said case.

50. A disc storing and transporting system as defined in claim 42 wherein said rear partition of said disc container body is a wall substantially parallel to the rear wall of the container and having locating ribs extending forwardly in the container, said wall having means thereon for coupling engagement with said retainer.

51. A disc storing and transporting system as defined in claim 50 wherein said means for coupling engagement comprise upwardly facing first connectors spaced apart along said rear partition, said retainer having downwardly facing second connectors that are releasably engaged with said first connectors.

52. A disc storing and transporting system as defined in claim 51 wherein said first connectors are sockets adjacent to the opposite ends of said rear partition and said second connectors are pins on said retainer sized to be received in said sockets with a tight fit.

53. A disc storing and transporting system as defined in claim 51 wherein said rear partition of said disc container body has an upper edge spaced above the bottom of the container, and said retainer is a crossbar extending along said upper edge to secure the disc-holding sleeves in the container.

54. A disc storing and transporting system as defined in claim 53 wherein said partition and said retainer have at least one locating member extending between them for locating engagement with portions of disc holding sleeves disposed between them.

55. A disc storing and transporting system as defined in claim 53 wherein two of said locating members in the form of upstanding pins are provided on said upper edge of said partition and positioned thereon to extend through openings in the disc-holding sleeves.

56. A disc storing and transporting system as defined in claim 42 wherein the means for hinging the rear portion of said container cover on the rear portion of the container body comprise hinge leaves on the rear edge of the cover of said container projecting into recesses in the rear wall of the body of the container, and hinge pins in said recesses received in said hinge leaves and defining a hinge axis extending along the rear wall of the body of said container.

57. A disc storing and transporting system as defined in claim 56 wherein said container cover is swingable rearwardly to an open position in which the body and the cover will lie flat on a supporting surface.

58. A disc storing and transporting system as defined in claim 42 further including a latch for holding the cover of the container releasably in the closed position.

59. A disc storing and transporting system as defined in claim 58 wherein said latch comprises a curved mounting wall upstanding from the central portion of the bottom of said container and having a concave outer face defining a front recess, a resiliently flexible latch arm secured to the bottom of the container body and projecting upwardly in said front recess beneath the front portion of the cover of the container, a detent opening in the front portion of the container cover overlying said front recess, and a detent on the upper end of said arm disposed in said second detent opening when the container cover is in the closed position and movable inwardly upon inward flexing of the arm to disengage said second latch.

60. A disc storing and transporting system as defined in claim 42 further including at least one disc-holding sleeve comprising two disc-holding envelopes each having a pocket therein for receiving and holding a disc of said predetermined thickness and diameter, said sleeves being disposed in side-by-side relation in the body of said disc container, and a flexible hinge strip joining said envelopes together along the rear side of said container, said retainer overlying said flexible hinge strip to retain the sleeve in the container.

61. A disc storing and transporting system as defined in claim 60 in which a plurality of sleeves are stacked together and folded around said retainer.

62. A disc storing and transporting system as defined in claim 60 wherein the plurality of sleeves that are stacked together will hold thirteen discs in said container.

63. A disc storing and transporting system as defined in claim 60 wherein the inside thickness of said container is greater than thirteen times the thickness of a disc in a sleeve, whereby additional space is provided in said container, and further including an accessory in said additional space.

64. A disc storing and transporting system as defined in claim 63 wherein said accessory is a booklet of approximately the same length and width as said envelopes, and is disposed between said sleeves and the body of said container.

65. A disc storing and transporting system as defined in claim 60 further including a booklet sized to lie entirely within said container beneath said sleeve, said booklet having a binder on one side engaging said rear partition in said container.

66. For use in a system for storing and transporting discs of predetermined thickness and diameter in disc-holding sleeves and holding accessory materials of predetermined sizes, a container comprising:

- a lower tray-like body of preselected size formed by rear and side walls having free upper edges and a bottom wall and providing a storage area wider and longer than said predetermined diameter and deeper than a preselected multiple of said predetermined thickness so as to provide storage space larger than the space to be occupied by a number of discs equal to said predetermined multiple, and an upper cover for said body normally overlying said storage area in a closed position and having rear and side cover edges adjacent to said rear and side upper edges;
- said cover having a rounded front portion forming a forward taper and having substantially flat sides;
- guides in said body defining the boundaries of said storage area;
- means for hinging the rear portion of said cover on the rear portion of said body for swinging into an open position;
- and a latch connecting said cover to the front wall of said body in said closed position and selectively releasable for movement of the cover to the open position, said latch comprising:
- a resiliently flexible arm on the front of said body extending upwardly and forwardly toward the rounded front portion of the cover, a detent on the upper end of said arm, and a detent opening in said cover receiving said detent when the cover is in the closed position, said arm being yieldable inwardly to disengage said detent from said opening.

67. A container for a disc storing and transporting system as defined in claim 66 wherein said body and said arm are formed integrally of plastic.

68. A container for a disc storing and transporting system as defined in claim 66 wherein said detent is an oval button and said detent opening is oval and sized and positioned to receive the button in a flush latching position as the cover is closed.

69. A container for a disc storing and transporting system as defined in claim 66 wherein said container is an outside case also having a rounded front wall curving up to said cover, and a central recess in said front wall for said latch, said flexible arm having a lower end connected to said front wall in said recess and extending upwardly and forwardly to said detent, and said detent opening being formed in said cover to overlie said recess and receive said detent.

70. A container for a disc storing and transporting system as defined in claim 66 wherein said container is a disc holding container with a body having an open front side, and further including a latch wall upstanding from the bottom wall of said body in said open front side and centrally located beneath the rounded front portion of said cover when the latter is closed, said latch wall being bowed to form a front recess for said flexible arm, and said arm extending upwardly and forwardly to said detent.

* * * * *